(12) United States Patent
Shiina et al.

(10) Patent No.: US 6,453,318 B1
(45) Date of Patent: Sep. 17, 2002

(54) CONTROL APPARATUS OF STRUCTURED INFORMATION AND METHOD OF CONTROLLING THE INFORMATION

(75) Inventors: Yasuhiro Shiina; Masahiro Noguchi, both of Tokyo (JP)

(73) Assignee: Nippon Steel Corporation, Tokyo (JP)

( * ) Notice: Subject to any disclaimer, the term of this patent is extended or adjusted under 35 U.S.C. 154(b) by 0 days.

(21) Appl. No.: 09/349,976

(22) Filed: Jul. 9, 1999

(30) Foreign Application Priority Data

Jul. 10, 1998 (JP) .......................................... 10-211914

(51) Int. Cl.[7] .............................................. G06F 17/00
(52) U.S. Cl. ............................ 707/100; 707/4; 707/102
(58) Field of Search .............................. 707/4–10, 102, 707/103, 100; 717/5, 7; 714/712

(56) References Cited

U.S. PATENT DOCUMENTS

| 4,894,771 A | * | 1/1990 | Kunii et al. .................... 707/4 |
| 5,133,068 A | * | 7/1992 | Crus et al. ................... 707/100 |
| 5,303,367 A | * | 4/1994 | Leenstra, Sr. et al. ...... 707/102 |
| 5,369,761 A | * | 11/1994 | Conley et al. .................. 707/2 |
| 5,418,957 A | * | 5/1995 | Narayan ......................... 717/7 |
| 5,504,879 A | * | 4/1996 | Eisenber et al. ............. 707/100 |
| 5,535,325 A | * | 7/1996 | Cattell et al. ................ 707/102 |
| 6,038,566 A | * | 12/1997 | Tsai ............................ 707/102 |
| 5,713,014 A | * | 1/1998 | Durflinger et al. ............. 707/4 |
| 5,960,200 A | * | 9/1999 | Eager et al. .................... 717/5 |
| 5,978,940 A | * | 11/1999 | Newman et al. ............. 714/712 |
| 5,987,458 A | * | 11/1999 | Anderson et al. ............... 707/6 |
| 6,003,039 A | * | 12/1999 | Barry et al. ................. 707/103 |

* cited by examiner

*Primary Examiner*—Kim Vu
*Assistant Examiner*—Anh Ly
(74) *Attorney, Agent, or Firm*—Connolly Bove Lodge & Hutz LLP

(57) ABSTRACT

A management apparatus has a structure definition input unit for inputting the structure definition of information, a data definition input unit for inputting a data definition that represents entities of information and the relationship between the entities in accordance with the input structure definition, and a modeling unit for interpreting the input definitions and constraints to convert them into an ER model. Since an ER model can be obtained independently of the formats of input definitions, a user can freely define the structure of information as he or she likes regardless of the complexity of the structure, and need not relate information bidirectionally, and can freely and easily defines the structure of information.

14 Claims, 13 Drawing Sheets

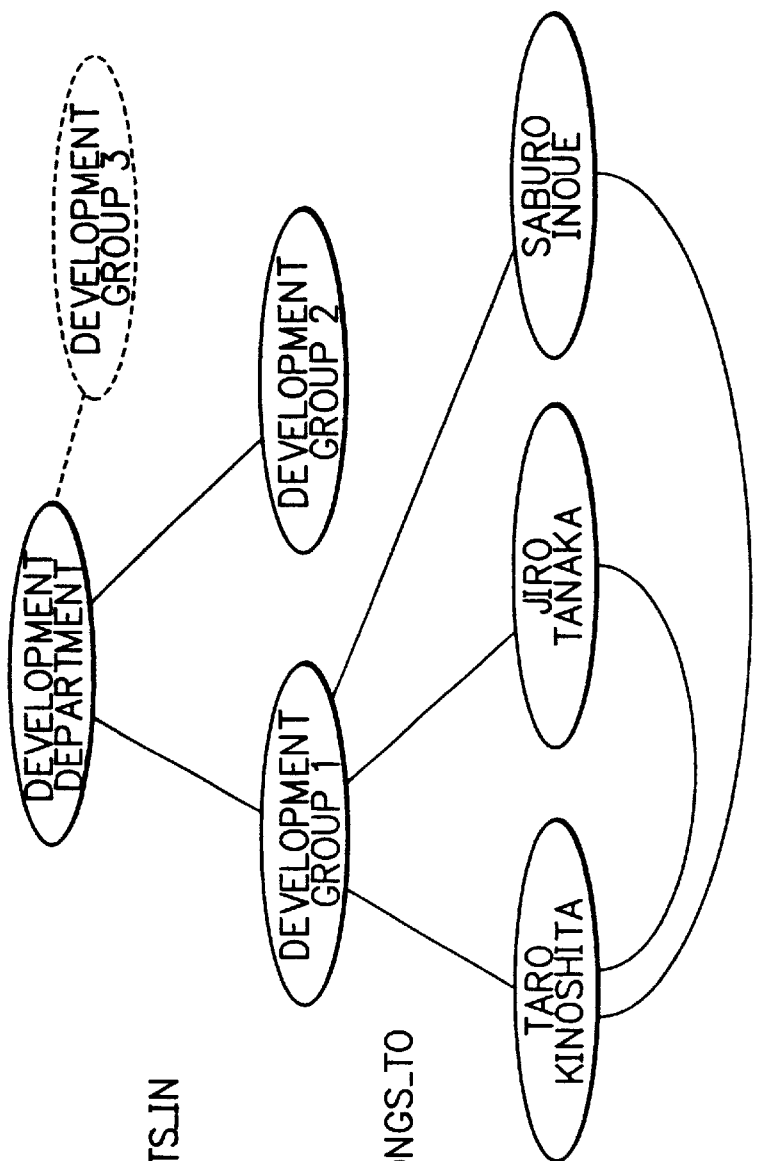
F I G. 2B
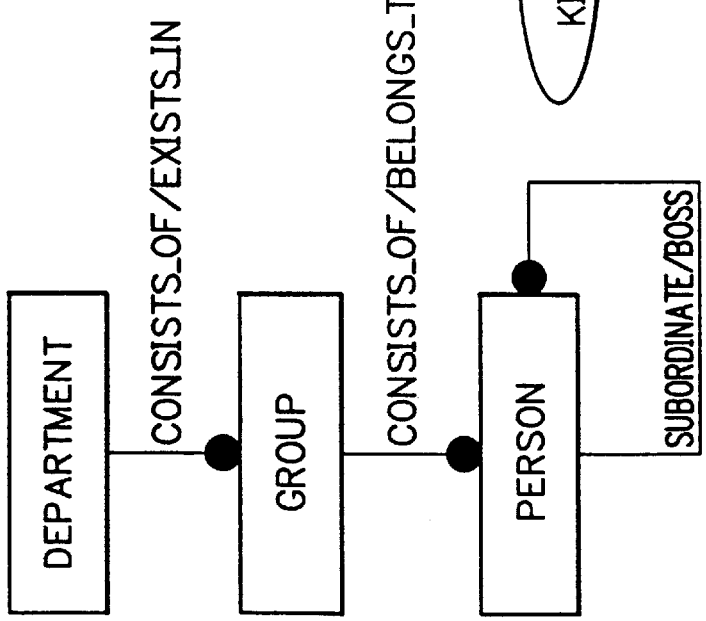
F I G. 2A

FIG. 3

```
1      //
2      // ORGANIZATION TABLE
3      //

4      module_class DEPARTMENT {
5              string                  SUMMARY ;
6              list_of_ref_to          GROUP  GROUP LIST ;
7              optional string         COMMENT ;
8      }

9      module_class GROUP {
10             string                  SUMMARY ;
11             optional string         COMMENT ;
12     }

13     module_class PERSON {
14             string                  TELEPHONE NUMBER ;
15             optional ref_to         GROUP PLACE ;
16             optional ref_to         PERSON BOSS ;
17             optional string         COMMENT ;
18     }

19     //
20     // End of File..
21     //
```

FIG. 4

```
//
// DEPARTMENT
// module DEPARTMENT DEVELOPMENT DEPARTMENT {
        SUMMARY = "DEPARTMENT FOR DEVELOPMENT" ;
        GROUP LIST -> (
                ::DEVELOPMENT GROUP 1
                ::DEVELOPMENT GROUP 2
        ) ;
}

//
// GROUP
// module GROUP  DEVELOPMENT GROUP 1 {
        SUMMARY = "FOR ○○ INDUSTRY" ;
}
module GROUP  DEVELOPMENT GROUP 2 {
        SUMMARY = "FOR ×× INDUSTRY" ;
}

//
// PERSON
// module PERSON  TARO KINOSHITA {
        TELEPHONE NUMBER = "1234" ;
        PLACE -> ::DEVELOPMENT GROUP 1 ;
}
module PERSON  JIRO TANAKA {
        TELEPHONE NUMBER = "1235" ;
        PLACE -> ::DEVELOPMENT GROUP 1 ;
        BOSS -> ::TARO KINOSHITA ;
}
module PERSON  SABURO INOUE {
        TELEPHONE NUMBER = "1236" ;
        PLACE -> ::DEVELOPMENT GROUP 1 ;
        BOSS -> ::TARO KINOSHITA ;
}

//
// End of File..
//
```

FIG. 5

```
//
// DEPARTMENT
// module DEPARTMENT  DEVELOPMENT DEPARTMENT {
        SUMMARY = "DEPARTMENT FOR DEVELOPMENT" ;
        GROUP LIST → (
                ::DEVELOPMENT GROUP 1
                ::DEVELOPMENT GROUP 2
                ::DEVELOPMENT GROUP 3
        ) ;
}

//
// GROUP
// module GROUP  DEVELOPMENT GROUP 1 {
        SUMMARY = "FOR ○○ INDUSTRY" ;
}
module GROUP  DEVELOPMENT GROUP 2 {
        SUMMARY = "FOR ×× INDUSTRY" ;
}

//
// PERSON
// module PERSON  TARO KINOSHITA {
        TELEPHONE NUMBER = "1234" ;
        PLACE −> ::DEVELOPMENT GROUP 1 ;
}
module PERSON  JIRO TANAKA {
        TELEPHONE NUMBER = "1235" ;
        PLACE −> ::DEVELOPMENT GROUP 1 ;
        BOSS −> ::TARO KINOSHITA ;
}
module PERSON  SABURO INOUE {
        TELEPHONE NUMBER = "1236" ;
        PLACE −> ::DEVELOPMENT GROUP 1 ;
        BOSS −> ::TARO KINOSHITA ;
}

//
// End of File..
//
```

F I G. 6

UNDEFINED PORTION LIST

■ UNDEFINED MANDATORY MEMBERS: 0
■ UNDEFINED REFERENCE—TO OBJECTS: 1

1. ::DEVELOPMENT DEPARTMENT
   — GROUP LIST : Reference—to object undefined.(::DEVELOPMENT GROUP 3)

EXTERNAL UNDEFINED PORTION LIST

■ UNDEFINED EXTERNAL REFERENCE—TO OBJECTS: 0

FIG. 8

CLASS/MODULE LIST

OBJECT LAYER

- PERSON
  - ::TARO KINOSHITA
  - ::JIRO TANAKA
  - ::SABURO INOUE
- DEPARTMENT
  - ::DEVELOPMENT DEPARTMENT
- GROUP
  - ::DEVELOPMENT GROUP 1
  - ::DEVELOPMENT GROUP 2

CLASS LIST

- PERSON
- DEPARTMENT
- GROUP

UNDEFINED PORTION LIST

FIG. 9

DEPARTMENT

DEVELOPMENT DEPARTMENT

SUMMARY

DEPARTMENT FOR DEVELOPMENT

GROUP LIST

- ::DEVELOPMENT GROUP 1
- ::DEVELOPMENT GROUP 2

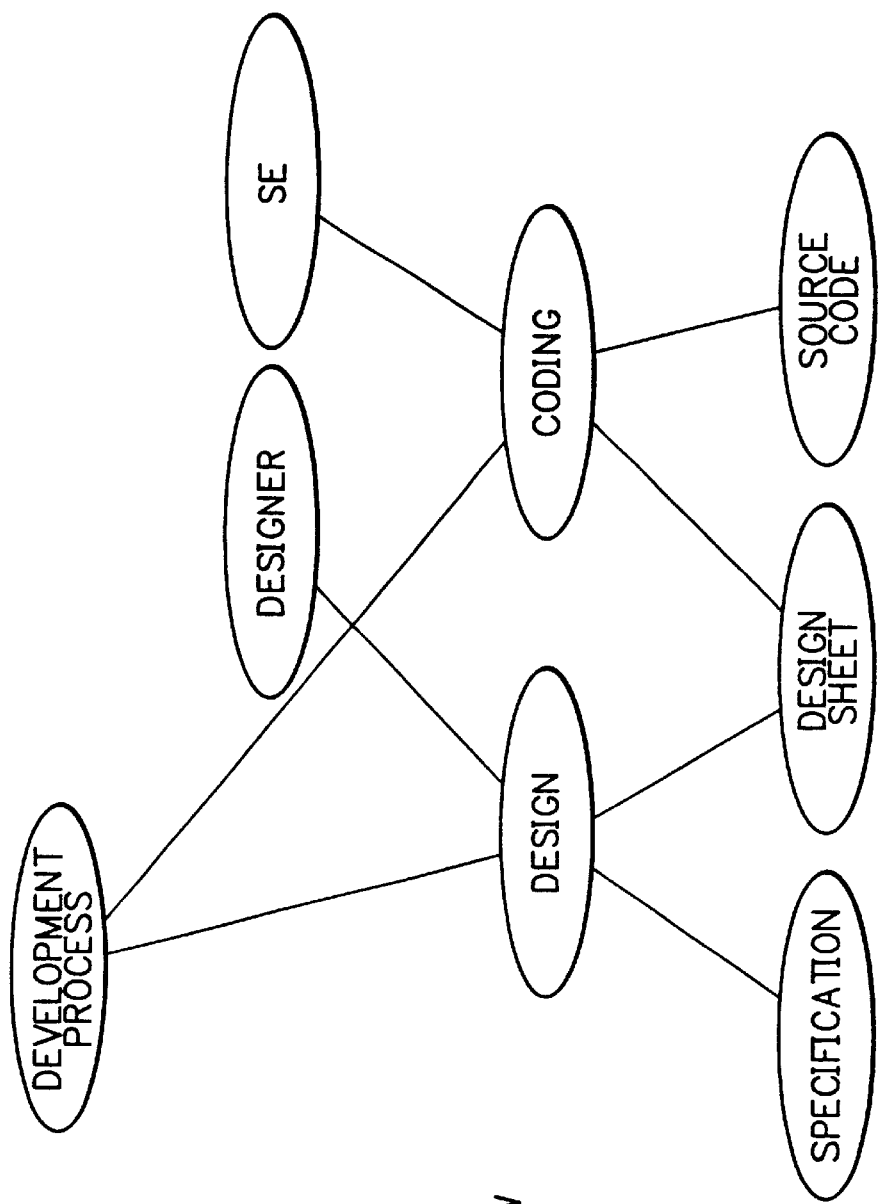
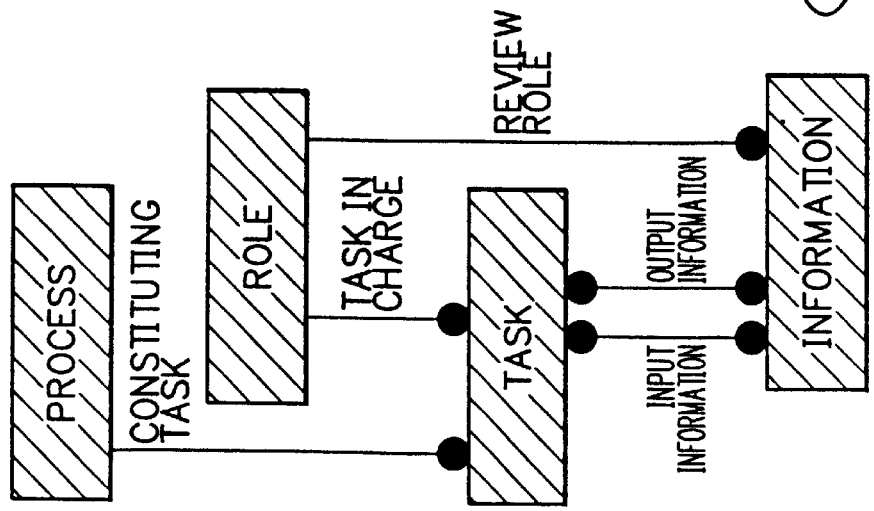

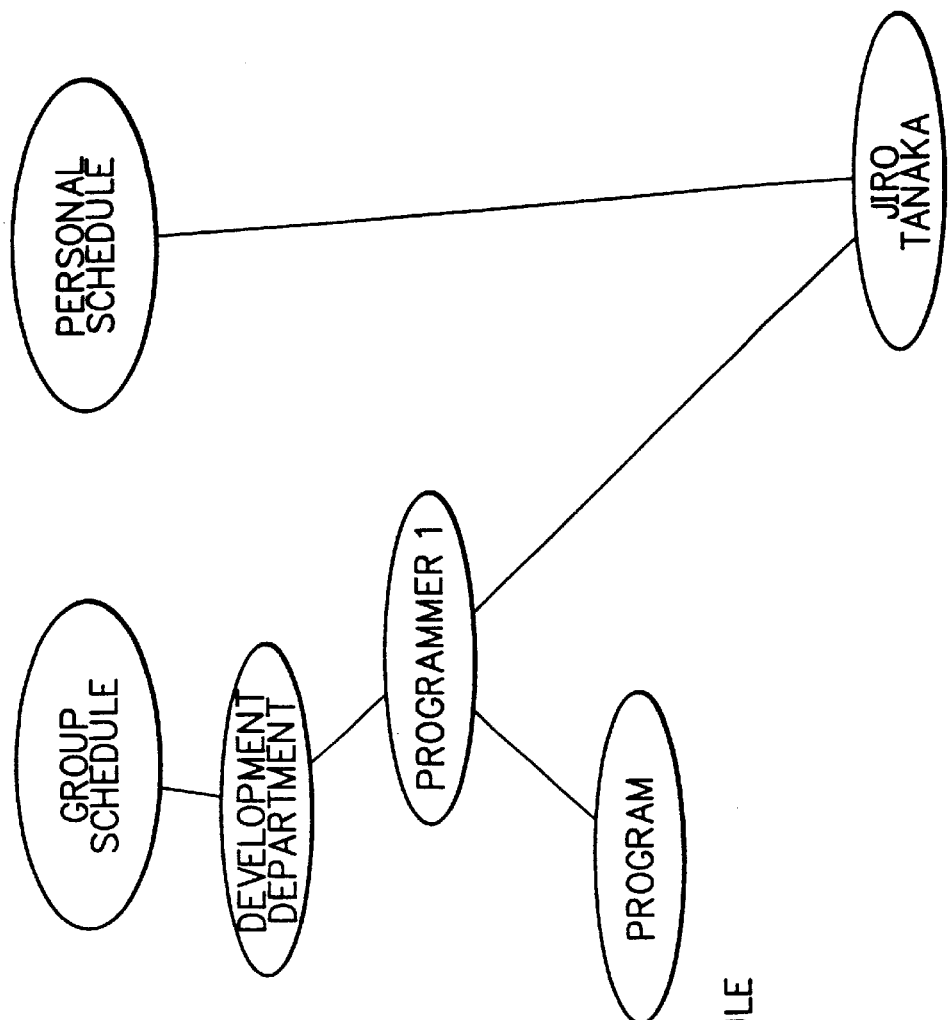
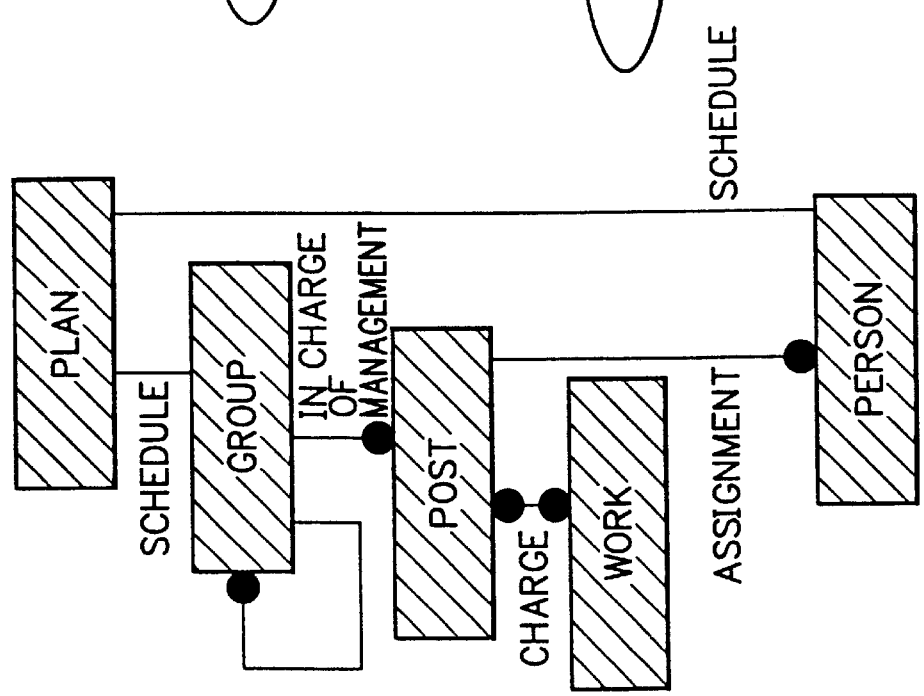

CONTROL APPARATUS OF STRUCTURED INFORMATION AND METHOD OF CONTROLLING THE INFORMATION

BACKGROUND OF THE INVENTION

1. Field of the Invention

The present invention relates to a management apparatus of structured information, a method of managing the information, and a recording medium that stores a program for implementing the method and, more particularly, to a technique suitably used in a system which supports creation, control, and use of related or structured information.

2. Background of the Invention

In general, upon developing a system or making tasks using the developed system, various kinds of information are used. These pieces of information are not independent in practice, but normally have relationships with other kinds of information. Not only in the field of system development, but also in various other fields (for example, upon creating various documents such as presentation references, on-line manuals, and the like, or various databases such as address books, glossaries, and the like), these pieces of information to be used often have relationships.

In such cases, one often wants to have flexibility in managing related, i.e., structured information with a computer. For example, to improve the productivity of software development, it is effective to control appropriately the meanings of terms and their associated information that appear in a specification. More specifically, an improvement in development efficiency may be expected if a system defined by the relationship between the specification and terms, the relationship between terms on the specification and implementation information (information such as variable names upon programming, or variable types, constraints, and the like), the relationship between terms (synonyms or the like), and so forth is appropriately controlled. It is more convenient if not only synonyms but also sets of conceptually relevant information such as "computer" and "personal computer" are related to each other.

Conventionally, some tools for managing such structured information have been proposed and are used. However, these tools must relate sets of information in accordance with their predetermined schemes, and for example, a pair of information, which have relationships bidirectionally, must be related to each other in both directions. For this reason, the structure cannot be freely defined, and the operation is very cumbersome.

For example, in system development, many people work in collaboration to create and manage such structured information. In this case, anomalies are highly likely to crop up in the created structure of information. Conventionally, such anomalies must be manually found and corrected.

Even when a tool for finding anomalies is used, it merely finds an anomaly and informs the user of an error. Hence, in the conventional approach, consistency must be checked every time one item of information is input, and one proceeds with tasks while checking/maintaining consistency.

In this case, in a collaboration of operators, an operator has to wait for input from another operator before he or she can input his or her own information, or his or her input may be disabled by failures of another operator. In addition, if such work is not done in perfect concert, errors occur again. As a result, such collaboration requires a very long time to remove anomalies.

If an anomaly is found, information that includes the anomaly, and one of collaborators who created the information must be checked, and the next task must be started after the anomaly is removed. In this case, both of the information which has caused an anomaly and the information which is related thereto cannot be input to the system and cannot be used.

In this manner, the conventional tool for managing structured information is not suitable for collaboration of a large number of operators since they must carefully proceed with tasks in the process of creation of information.

SUMMARY OF THE INVENTION

It is an object of the present invention to provide a system which can freely define the structure of structured information by simple operations, and can cope with collaborations of a large number of operators.

In order to achieve the above object, according to the present invention, a management apparatus for managing information with a structure, comprises first input means for inputting a definition of the structure, second input means for inputting a data definition representing an entity of each piece of information and a relationship between entities in accordance with the structure definition input by the first input means, and modeling means for interpreting the definitions input by the first and second input means and converting them into an ER model.

According to another aspect of the present invention, the apparatus further comprises anomaly detection means for detecting an anomaly of definition contents when the definitions input by the first and second input means are converted into the ER model by the modeling means.

According to still another aspect of the present invention, the apparatus further comprises means for developing the ER model into hypertext.

According to the present invention, a method of managing information with a structure, comprises the steps of inputting a definition of the structure, inputting a data definition representing an entity of each piece of information and a relationship between entities in accordance with the input structure definition, and converting the input definitions into an ER model by interpreting the definitions.

According to the present invention, a computer readable recording medium records a program for making a computer in a management apparatus for managing information with a structure, function as first input means for inputting a definition of the structure, second input means for inputting a data definition representing an entity of each piece of information and a relationship between entities in accordance with the structure definition input by the first input means, and modeling means for interpreting the definitions input by the first and second input means and converting them into an ER model.

As described above, according to the present invention, since the means for converting target information into an ER model in accordance with the input structure definition or data definition is provided, an identical ER model can be obtained independently of the input formats of definitions. Hence, the user can freely define the structure of information as he or she likes regardless of the complexity of that structure. In addition, since information need be related from one direction only, the structure of information can be easily defined, and the work efficiency upon creating and managing structured information can be greatly improved.

According to another feature of the present invention, since means for detecting anomalies of definition contents when an input definition is converted into an ER model is provided, anomalies can be automatically detected and presented upon conversion into an ER model, and the work efficiency upon creating structured information can be greatly improved. Hence, the work efficiency can be improved even in a collaboration of a large number of operators, in which anomalies are highly likely to occur.

According to still another feature of the present invention, since the means for developing the converted ER model into hypertext is also provided, a high-speed information navigation environment can be obtained. Since the ER model can clearly define the relationship between entities, movement between entities can be freely indicated bidirectionally, and cross reference of information can be easily attained.

BRIEF DESCRIPTION OF THE DRAWINGS

FIG. 2A shows an example of the structure of a personnel organization model, and FIG. 2B shows an example of an ER model generated based on the structure;

FIG. 3 shows an example of a structure definition according to the example shown in FIG. 2A;

FIG. 4 shows an example of a data definition according to the example shown in FIG. 2A;

FIG. 5 shows another example of a data definition according to the example shown in FIG. 2A;

FIG. 6 shows an output example of an anomaly detection result;

FIG. 8 shows an output example of hypertext in the HTML format;

FIG. 9 shows an output example of hypertext in the HTML format;

FIG. 10A shows an example of the structure of a workflow model, and FIG. 10B shows an example of an ER model generated based on the structure;

FIG. 13A shows an example of the structure of a schedule management model, and FIG. 13B shows an example of an ER model generated based on the structure.

DETAILED DESCRIPTION OF THE PREFERRED EMBODIMENTS

The preferred embodiments of the present invention will be described hereinafter with reference to the accompanying drawings.

Figure 1:
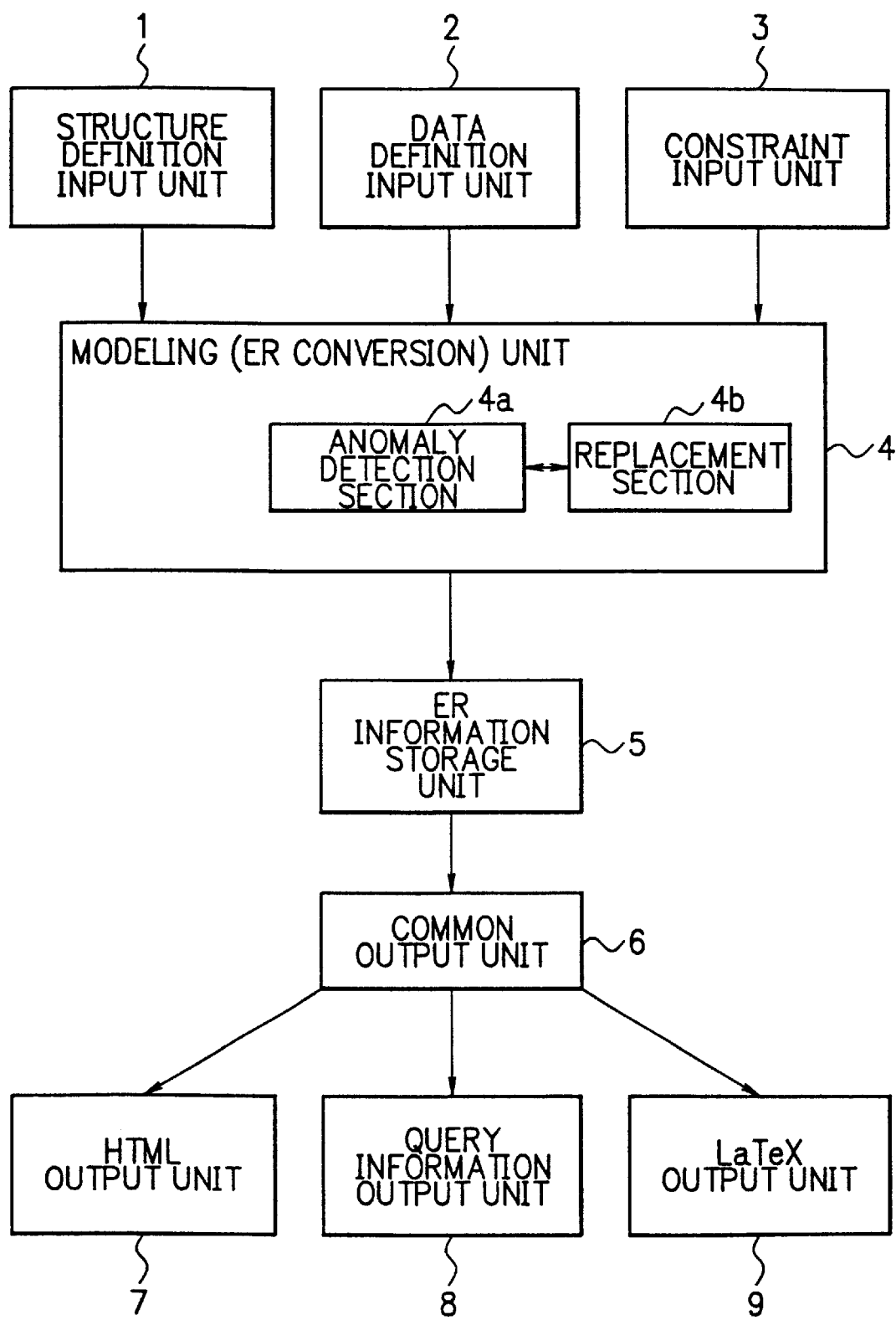
FIG. 1 is a block diagram showing the elemental functional features of a management apparatus of structured information according to the present invention.

FIG. 1 is a block diagram showing the elemental functional features of a management apparatus of structured information according to the present invention. A management apparatus of structured information and a method of managing the information will be explained below while giving some examples.

Referring to FIG. 1, a structure definition input unit 1 is provided for defining the structures of various kinds of information to be managed. The structure definition input unit 1 can define structures for the inter-relationship between some pieces of information, information associated with each piece of information, and the like. Assume that the structure of a personnel organization shown in FIG. 2A is defined as an example. FIG. 2A shows the structure in which some "groups" are present under a "department", several "persons" belong to each "group", and there is certain seniority among the people.

A definition of such structure is input as text in practice. For example, the structure shown in FIG. 2A is described, as shown in FIG. 3. In the text shown in FIG. 3, line numbers are assigned to the left side for the sake of convenience, but are not necessary in practice. Definitions corresponding to "department", "group", and "person" in FIG. 2A are respectively described in the fourth to eighth lines, ninth to 12th lines, and 13th to 18th lines in FIG. 3. Units such as "department", "group", and the like defined in this structure will be hereinafter referred to as classes, and a data entity to be actually input will be hereinafter referred to as an instance.

For example, class "department" is defined by three elements "string", "list_of_ref_to", and "optional string". "string" in the fifth line defines a character string that describes a summary of this class. "list_of_ref_to" in the sixth line defines to refer to another class, and to form its list. More specifically, class "group" is referred to, and instances present there are extracted to form a "group list".

In the seventh line, "optional string" assures a comment column. However, an element appended with this "optional" indicates a portion where constraint check (confirmation of anomaly) can be skipped. As will be described in detail later, constraint check confirms if this element must be present in a corresponding instance.

"optional ref_to" in the 15th line describes a definition for referring to class "group" and using an instance present there as "position". In this case, like the above "optional string", since constraint check (confirmation of anomaly) can be skipped, it need not be confirmed if an element of the corresponding instance is present, and the element may be blank.

In case of "optional ref_to", however, since another class must be referred to, as indicated by "ref_to", if the corresponding instance is not blank, it is checked if a reference destination indicated by its contents is defined. For example, in the example of the 15th line, since class "group" must be referred to and an instance present there must be used as "position", it is checked if class "group" as the reference destination is defined.

By defining classes in this manner, the structure of information can be defined. Note that the first to third lines and 19th to 21st lines are simply comment lines, which are not related to operations. In this embodiment, a constraint input unit 3 can also describe information on various constraints together with the definitions with the above structure. For example, FIG. 2A does not show any telephone number, but a telephone number is defined as "string" in the 14th line in FIG. 3. That is, it is defined that "person" must have "telephone number".

Referring back to FIG. 1, a data definition input unit 2 is provided for inputting data definitions that represent entities of information to be managed, relationships among entities, and the like in accordance with the structure definitions input by the structure definition input unit 1. For example, as shown in FIG. 4, entities of information such as "development department" as an entity of the department, "development group 1" and "development group 2" as entities of the group, and "Taro Kinoshita", "Jiro Tanaka", and "Saburo Inoue" as entities of the person, information indicating relationships among these entities, information on constraints such as telephone numbers, information corresponding to "optional" in FIG. 3, and the like are input as a script.

As for the relationships among the entities, the data definition of the department describes that a group list of "development department" includes "development group 1" and "development group 2", and the data definition of the person describes that "Taro Kinoshita", "Jiro Tanaka", and "Saburo Inoue" all belong to "development group 1", and the boss of "Jiro Tanaka" and "Saburo Inoue" is "Taro Kinoshita".

A modeling unit 4 is provided for interpreting the structure definitions, data definitions, and constraints input by the input units 1 to 3 and converting them into an ER model (entity-relationship model). The ER model is one of several data models, and expresses a target world mainly using two concepts, i.e., an entity and relationship. Entities are related according to meanings of relationships, and both the entities and relationship can have attributes (for example, entity "person" can have attributes such as a telephone number, name, and the like, as described above).

FIG. 2B shows an example of the conversion result of the data definition shown in FIG. 4 into an ER model. Referring to FIG. 2B, entities are indicated by ovals, and relationships are indicated by solid lines that connect the ovals. Note that FIG. 2B does not illustrate any attributes (telephone numbers and the like) linked to these entities and relationships. Information of the converted ER model is stored and saved in an ER information storage unit 5 shown in FIG. 1.

As described above, according to this embodiment, since means for converting information to be controlled into an ER model is provided, the user can freely describe the structure of information as he or she likes regardless of the complexity of the structure. That is, for example, independently of the description format of the structure shown in FIG. 2A (e.g., independently of the perspectives in which the relationship between "department" and "group", the relationship between "group" and "person", and the like) are described, since an identical model is obtained by ER developing, the way of defining the relationship is not particularly limited, and the relationship can be freely described.

More specifically, in the examples shown in FIGS. 3 and 4, the relationship between "department" and "group" is described in the data definition of "department" (the format describing that "development department" includes "development group 1" and "development group 2"), and the relationship between "group" and "person" is described in the data definition of "person" (the format describing that Mr. So-and-so belongs to "development group 1"). However, even when these relationships are described in other description formats, they can be developed into an identical ER model.

For example, even when both of the relationship between "department" and "group" and the relationship between "group" and "person" are described in the data definition of "group" (the format describing that "development group 1" and "development group 2" belong to "development department" and "development group 1" has Mr. So-and-so), they can be developed into an identical ER model. In this manner, according to the management apparatus of structured information according to this embodiment, the user can freely and easily define a structure in the format that he or she can easily understand.

As shown in FIG. 1, in the management apparatus of structured information according to this embodiment, the modeling unit 4 comprises an anomaly detection section 4a and a replacement section 4b. The anomaly detection section 4a detects anomalies of the definition contents when the definitions and constraints input by the input units 1 to 3 are converted into an ER model by the modeling unit 4. For example, the anomaly detection section 4a detects anomalies such as the absence of a mandatory item to be input according to the structure definition, non-definition of an entity itself even though the relationship between entities is defined, and so forth, by inspecting input constraints.

For example, as shown in FIG. 5, when "development group 3" is described as a group list in the data definition of "department" but its entity is not defined in the data definition of "group" (this indicated by dotted lines in FIG. 2B), an anomaly, i.e., the presence of the relationship which cannot connect between entities, is detected. For example, when the structure of "sales department" (not shown), which is not related to "development department", is defined in addition to "development department", no anomaly occurs even when no relationship is defined. In this manner, whether or not an anomaly is detected can be described as a constraint.

Upon detecting an anomaly, it can be immediately output as an error. But, when such anomaly is merely output as an error, all pieces of information relevant to the anomaly portion can no longer be used, and the creation process of structured information cannot be sufficiently supported. That is, the information structure is gradually completed via trials and errors, and many anomalies are normally produced in the creation process. But, when a detected anomaly is merely output as an error, conversion into an ER model is interrupted every time one anomaly is found.

In collaboration of a large number of operators, such anomalies often crop up, and if operation is interrupted every time an anomaly is found, work efficiency becomes poor. In this embodiment, upon detecting such anomaly, it is not immediately excluded as an error, but a temporary entity is generated. That is, in this embodiment, an anomaly is temporarily permitted, and operation is not interrupted. Since information relevant to the anomaly portion can be used intact, the work efficiency can be greatly improved in comparison with the conventional system.

More specifically, in a process of permitting an anomaly, the replacement section 4b converts the anomaly portion detected by the anomaly detection section 4a into a definition of a special entity and relationship indicating an anomaly. In other words, in this embodiment, upon detecting any anomaly, the anomaly portion is replaced by the definition of a special entity and relationship to proceed with conversion into an ER model.

After the temporary entity is generated on the ER model, the anomaly can be variously processed using the temporary entity.

For example, the same process that is executed when a real entity is present can be done for the generated temporary entity. More specifically, as shown in FIG. 5, when an anomaly is detected, i.e., "development group 3" is described as a group list in the data definition of "department" but its entity is not defined in the data definition of "group", a relationship is actually defined from the entity of "development department" to the generated temporary entity so as to handle the temporary entity in the same manner as a real entity of "development group 3". In this manner, the process can proceed without determining any anomaly as an error.

On the other hand, the generated temporary entity may be handled as a special one. For example, a mark indicating a problem is appended on the ER model including the temporary entity. In this manner, an anomaly can be processed without any error, and the user can be informed that the anomaly is present at the marked portion.

Also, temporary entities generated may be found by search, and may be output together. FIG. 6 shows an example of the output picture plane. In FIG. 6, items are classified in units of types of anomalies, and a list of the total number of anomalies and actual locations of the anomalies is displayed. In this manner, the user can easily know occurrences of anomalies and their locations.

Furthermore, the generated temporary entity may be inhibited from being processed in the ER model. For example, in the example shown in FIG. 5, the definition of "development group 3", described as a group list in the data definition of "department", is processed as if it were not present. With this process, the anomaly portion can be handled as if it were not input.

Figure 7:
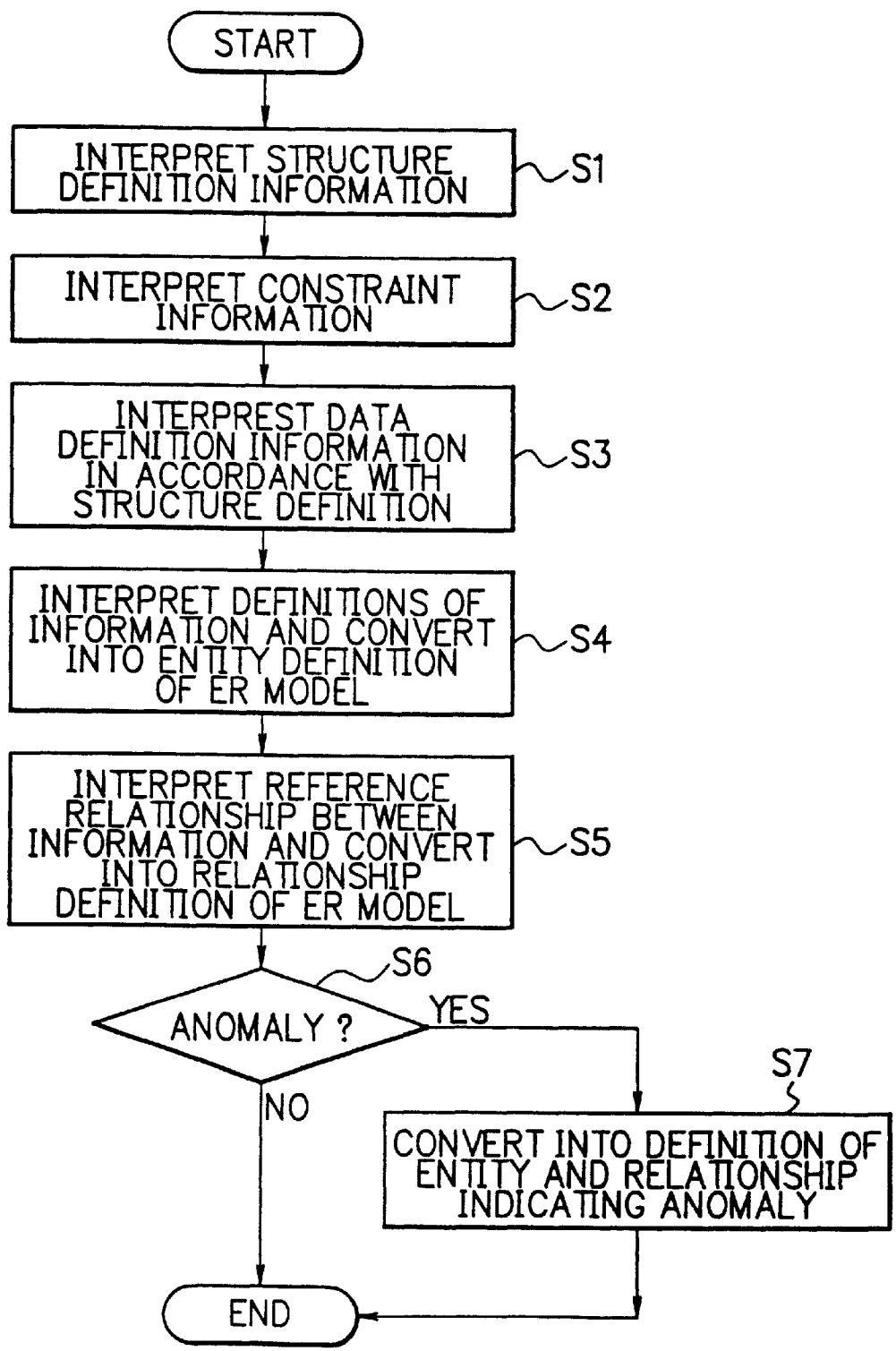
FIG. 7 is a flow chart showing conversion into an ER model by a modeling unit.

FIG. 7 is a flow chart showing the conversion into an ER model by the modeling unit 4 including the anomaly detection section 4a and replacement section 4b. The conversion will be described below with reference to the flow chart in FIG. 7. Referring to FIG. 7, structure definitions input by the structure definition input unit 1 are interpreted in step S1, constraints input by the constraint input unit 3 are interpreted in step S2, and data definitions input by the data definition input unit 2 are interpreted in accordance with the structure definitions in step S3.

In step S4, the structure definitions, data definitions, and definitions of constraints are interpreted, and all entities of an ER model are created according to the interpretation results. In step S5, relations among the entities are interpreted, and relationships among the created entities are created in accordance with the interpretation results. As a result, for example, if the structure that "a relationship is set but there is no corresponding entity" is defined, the presence of an anomaly is determined in step S6. In this case, the flow advances to step S7 to create a temporary entity and define a relationship, so as to avoid the anomaly.

In this manner, many anomalies are produced in collaboration with user terminals connected via a network. Hence, the conversion into an ER model is preferably continued with temporarily permitting the presence of anomalies in terms of improvement in the overall work efficiency. For example, when anomaly portions are presented together after conversion into an ER model, the progress of tasks can be controlled based on, e.g., the number of incomplete portions.

Referring back to FIG. 1, a common output unit 6 is provided for outputting ER information saved in the ER information storage unit 5 to a display or printer, (not shown) or transferring the information into the network. In this embodiment, the ER information can be output in various formats by an HTML output unit 7, a query information output unit 8, and a LaTex output unit 9 via the common output unit 6.

The HTML output unit 7 develops and outputs the contents of ER information into an HTML file group. More specifically, the unit 7 interprets the structure definition information input from the structure definition input unit 1, and forms generation rules of an HTML page on the basis of the structure definition. The formed generation rules can be modified (customized). At this time, divisions, items to be displayed, order, and the like of information in units of pages are determined in accordance with the rules. Items to be determined here include, e.g.,:

(1) whether only data definitions input by the data definition input unit 2 are displayed or information on inverse reference of a relationship (e.g., when reference from entity A to entity B is defined, entity A is reached from entity B) is also displayed;

(2) whether or not information on derivatives following the structure (e.g., when entity A refers to entity B, and entity B refers to entity C, entities B and C are derived from entity A) is also displayed;

(3) whether or not alert information of, e.g., anomalies is displayed in the same page;

(4) whether or not statistical information such as the number of items in a list or the like is displayed in the same page;

(5) whether the items are displayed in the form of a list or table; and so forth.

If the inverse reference information of the relationship is to be displayed, when information of entity B is displayed on the picture plane in the above example, a display indicating that entity B is referred to from entity A is also made. If the derivative information is to be displayed, when information of entity A is displayed on the picture plane in the above example, displays indicating that entities B and C are derived from entity A are also made. Note that derivative information in two steps, i.e., A→B→C, has been exemplified. But the number of steps is not particularly limited, and derivative information in four steps such as A→B→C→D→E or the like may be used.

The HTML output unit 7 outputs the individual contents of the ER information onto pages in accordance with the formed rule. In this case, the unit 7 defines a hyperlink between entities for which the relationship is defined by the data definition input unit 2, to provide a high-speed information navigation environment (inter-node movements by following links). When the inverse reference information of the relationship is displayed, the unit 7 defines not only a hyperlink according to the data definition input by the data definition input unit 2, but also a hyperlink corresponding to a relationship in a direction opposite to that of the defined one (in the above example, when information of entity B is displayed, a hyperlink is defined from entity B to entity A). In this manner, even when the data definition describes only a reference from a parent (A) to a child (B), the parent can be hunted up from the child. When the derivative information is displayed, the unit 7 defines a hyperlink indicating the relationship generated upon interpreting the structure of information (in the above example, when information of entity A is displayed, links are defined from entity A to entities B and C). Furthermore, a hyperlink that pertains to alert information can also be defined.

FIGS. 8 and 9 show examples of HTML hypertext outputs. In these figures, the underlined portions indicate portions where hyperlinks are defined, and by clicking this portion, the corresponding node can be immediately reached. FIG. 9 shows an example of picture displayed when "development department" is clicked on the picture shown in FIG. 8.

Especially in this embodiment, since the relationship between entities is clearly defined by the ER model, movement between entities can be freely displayed bidirectionally. In this manner, cross reference of information can be easily attained. In addition, since the anomaly detection result is also output in the hypertext format, as shown in FIG. 6, corresponding anomaly portion can be immediately hunted up through the hyperlink, so the work efficiency can be further improved.

Furthermore, upon inputting definitions and constraints by the input units 1 to 3, by inputting also the contents that define the responsibility range and presenting them together, causes of anomalies, e.g., whether the detected anomaly is a real anomaly, an anomaly resulting from definition errors of an operator him- or herself, an anomaly that occurs since information of a collaborator has not been processed yet, or the like, can be easily specified. More specifically, this can be implemented by definitions in the script, as shown in FIGS. 3 and 4.

For example, a definition:
extern branch place of employment;
is further added as the 22nd line in the script shown in FIG. 3. This line defines that an instance is extracted by referring to class "branch" defined in an external script other than that of the structure definitions shown in FIG. 3, and is used as "place of employment". If the range of responsibility of an operator includes only classes defined within the range of the script of FIG. 3, class "branch" falls outside his responsibility range. In this manner, by separating the responsibility ranges, creation by operators can be efficiently supported.

As can be seen from the above description, independent scripts need not always be prepared for structure definitions, data definitions, or constraints. That is, the structure definitions, data definitions, and constraints can be described in one script as long as they are written in their own grammars.

The query information output unit 8 generates query information for a simple search using a list of ER information saved in the ER information storage unit 5, lists in units of types of information, names, or the like, or an ambiguity search using keywords, and develops and outputs it as, e.g., an HTML file. The LaTex output unit 9 generates and outputs print data on the basis of ER information saved in the ER information storage unit 5.

As described above in detail, according to this embodiment, the user can freely define the structure of information to be managed, from positions where it is easy for him or her to write or he or she can write regardless of its complicated structure. Moreover, information can be related from only one direction, and the structure of information can be easily defined.

Also, according to this embodiment, since anomalies are automatically detected and presented upon conversion into an ER model, the work efficiency upon creating structured information can be improved. When such structured information is created by collaboration of a large number of operators, since anomalies are highly likely to be produced, this embodiment is particularly effective for such collaboration.

In the above embodiment, creation of information having a structure that pertains to a personnel organization has been exemplified. However, the present invention is not limited to such a specific example, but can be applied to any other structured information. For example, the present invention can also be applied to a workflow model shown in FIGS. 10A and 10B, a glossary model shown in FIGS. 11A and 11B, a resource management model shown in FIGS. 12A and 12B, and a schedule management model shown in FIGS. 13A and 13B as other examples.

The structure of the workflow model shown in FIGS. 10A and 10B will be briefly explained below. For example, assuming a work of "software development", "development process" requires a "design" task for designing software, and a "coding" task for actually programming in accordance with the design contents. The "design" task requires "specification", and as a result, "design sheet" is completed. "Designer" is in charge of this task, and "SE" generates "source code" by "coding" based on "design sheet".

Furthermore, a relationship of "review role" is present between "role", such as the designer or SE, and "information", such as the specification, design sheet, or source code. In the ER model shown in FIG. 10B, no solid line is drawn between "designer" and "design sheet". When the solid line corresponding to "review role" is drawn there, a relationship indicating that "designer" reviews "design sheet" (by, e.g., affixing an approval seal) can be provided. As described above, by following derivative information in the order of process→task→input information/output information, information generated and used inside the process and information exchanged with the outside can be independently displayed together.

Figures 11A, 11B:
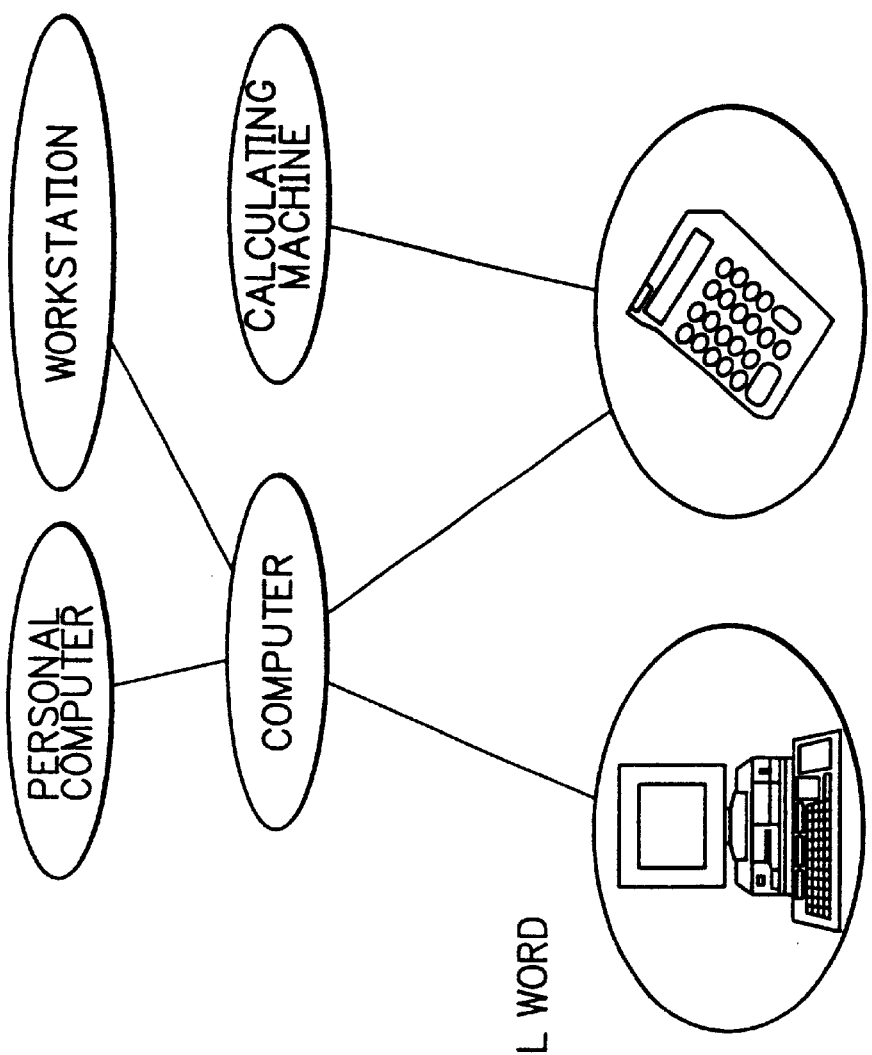
FIG. 11A shows an example of the structure of a glossary model.
FIG. 11B shows an example of an ER model generated based on that structure.
Figure 12B:
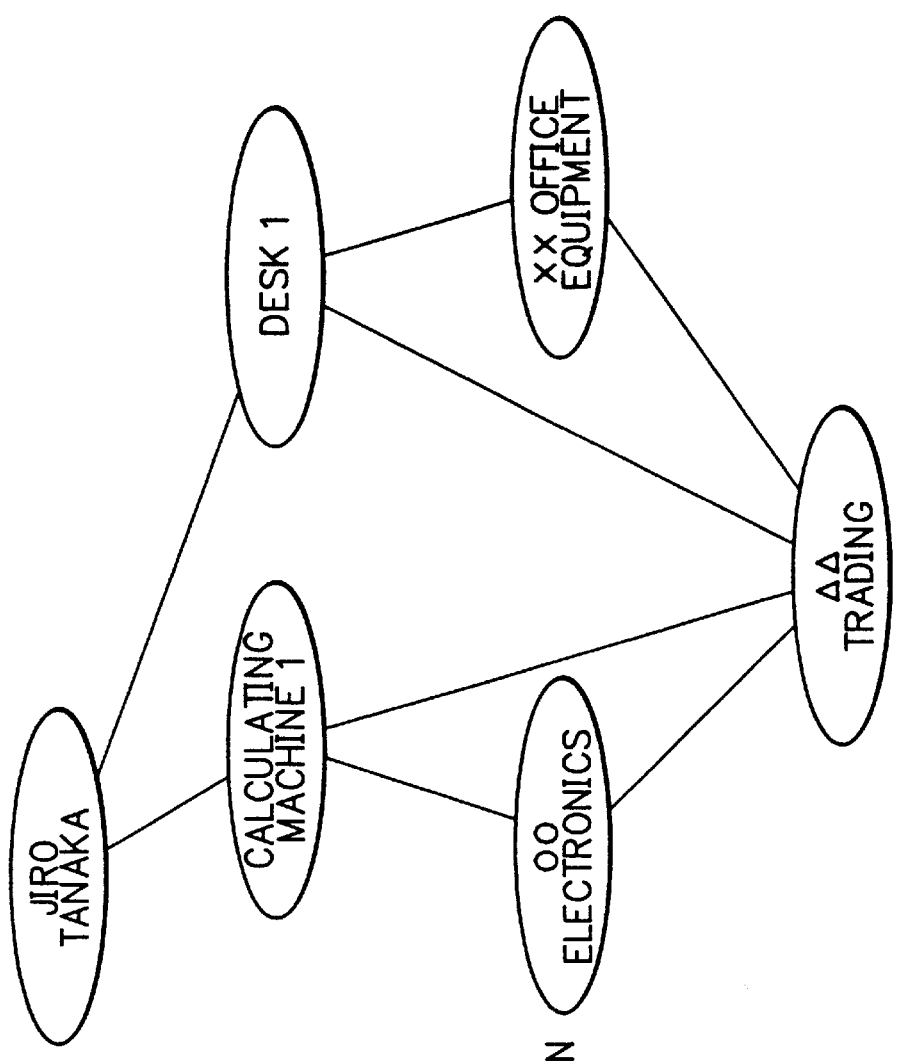
FIG. 12B shows an example of an ER model generated based on the structure.
Figure 12A:
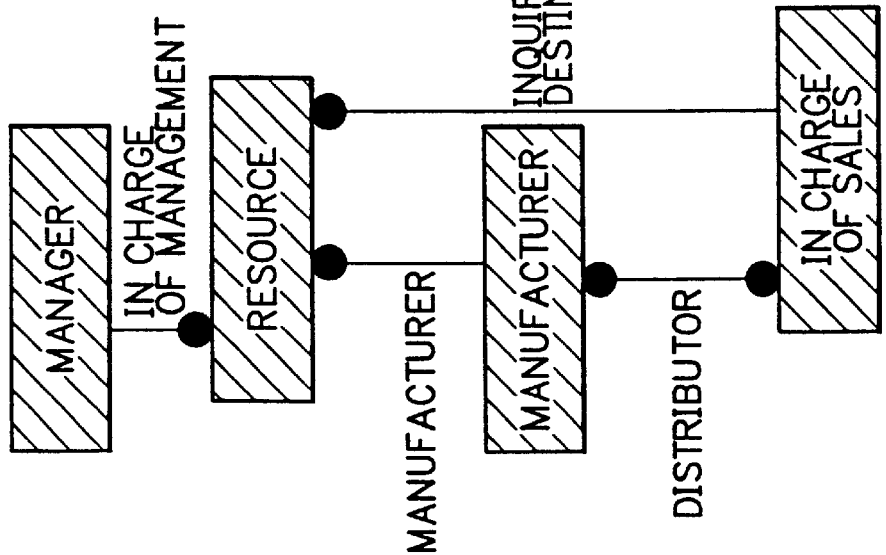
FIG. 12A shows an example of the structure of a resource management model.

A glossary model shown in FIGS. 11A and 11B defines as a structure relationships among terms such as "personal computer", "workstation", "computer", "calculating machine", and the like, their meanings, and synonyms/multivocal words, or relationships among terms. A resource management model shown in FIG. 12A and 12B defines a structure having relationships in which "calculating machine 1" is manufactured by "○○ electronics" and distributed by "ΔΔ trading" and "desk 1" is manufactured by "XX office equipment" and distributed by "ΔΔ trading" under the management of "Jiro Tanaka".

A schedule management model shown in FIGS. 13A and 13B defines a structure in which "jiro Tanaka" is "programmer 1" of "development department", makes "programming" according to "group schedule", and also has "personal schedule" independently of the "group schedule".

Blocks 1 to 9 shown in FIG. 1 are constructed in practice by a microcomputer system which comprises a CPU or MPU, ROM, RAM, etc., and their operations are implemented in accordance with task programs stored in the ROM but they may be implemented by hardware. The present invention includes a case wherein an embodiment is achieved by supplying a program code of software for implementing the functions of blocks 1 to 9, to the ROM, and making blocks 1 to 9 operate in accordance with the program.

In this case, the program code itself of software implements the functions of the embodiment, and so the program code itself and means for supplying the program code to a computer, e.g., a recording medium that stores the program code are included by the scope of the present invention. As such, a recording medium for storing the program code, other than the above-mentioned ROM, for example, a floppy disk, a hard disk, an optical disk, an optical-magnetic disk, a CD-ROM, a CD-I, a CD-R, a CD-RW, a DVD, a zip, a magnetic tape, a nonvolatile memory card, or the like can be used.

When the functions of the above embodiment are implemented not only by executing the supplied program code by the computer but also by executing the program code in cooperation with an OS (operating system) or another application software that is running on the computer, such program code is included in the embodiments of the present invention.

Furthermore, the present invention includes a case wherein the functions of the above embodiment are implemented by storing the supplied program code in a memory equipped on a function expansion board of the computer or a function expansion unit connected to the computer, and then executing some or all of actual processes by a CPU or the like equipped on the function expansion board or unit on the basis of instructions of the program code.

What is claimed is:

1. A management apparatus for controlling information with a structure, comprising:

first input means for inputting a definition of the structure;

second input means for inputting a data definition representing an entity of each piece of information and a relationship between entities in accordance with the structure definition input by said first input means;

modeling means for interpreting the definitions input by said first and second input means and converting them into an ER model indicating said structure, entities of said information and a relationship between said entities;

third input means for inputting an arbitrary constraint when the structure of the information is defined; and anomaly detection means for detecting an anomaly of definition contents when the definitions input by said first and second input means are converted into the ER model by said modeling means, and for inspecting the constraint.

2. An apparatus according to claim 1, wherein said modeling means comprises:

first interpretation means for interpreting the entity of each piece of information input by said first and second input means;

second interpretation means for interpreting the relationship between the pieces of information;

entity conversion means for obtaining an entity definition of the ER model by conversion in accordance with an interpretation result of said first interpretation means; and relationship conversion means for obtaining a relationship definition of the ER model by conversion in accordance with an interpretation result of said second interpretation means.

3. An apparatus according to claim 1, wherein the anomaly detected by said anomaly detection means is output as an error.

4. An apparatus according to claim 1, further comprising replace means for converting an anomaly portion detected by said anomaly detection means into a definition of an entity and relationship indicating the anomaly.

5. An apparatus according to claim 1, further comprising means for developing the ER model into hypertext.

6. An apparatus according to claim 5, wherein said means for developing makes a hyperlink based on reference information of a data definition indicating a relationship between entities input by said second input means, and a hyperlink corresponding to a relationship in a direction opposite to said reference information.

7. A method of managing information with a structure, comprising the steps inputting a definition of the structure;

inputting a data definition representing an entity of each piece of information and a relationship between entities in accordance with the input structure definition; and converting the input definitions into an ER model indicating said structure, entities of said information and a relationship between said entities and interpreting the definitions; and detecting an anomaly of definition contents upon conversion into the ER model;

inputting an arbitrary constraint when the structure of the information is defined; and inspecting said arbitrary constraint.

8. A method according to claim 7, further comprising the step of converting the detected anomaly portion into a definition of an entity and relationship indicating the anomaly, and extracting and presenting the anomaly portions together after completion of the mode conversion.

9. A method according to claim 7, further comprising the step of developing the ER model into hypertext.

10. A method according to claim 9, wherein said step of developing the ER model into hypertext includes making a hyperlink based on reference information of said data definition indicating a relationship between entities input, and developing a hyperlink corresponding to a relationship in a direction opposite to said reference information.

11. A computer readable recording medium that records a program for making a computer in a control apparatus for managing information with a structure, function as:

first input means for inputting a definition of structure;

second input means for inputting a data definition representing an entity of each piece of information and a relationship between entities in accordance with the structure definition input by said first input means;

modeling means for interpreting the definitions input by said first and second input means and converting them into an ER model indicating said structure, entities of said information and a relationship between said entities;

means for detecting an anomaly of definition contents upon conversion into the ER model;

implementing a function for inputting an arbitrary constraint when the structure of the information is defined; and inspecting said arbitrary constraint.

12. A medium according to claim 11, recording a program for making the computer further implement a function as means for detecting an anomaly of definition contents upon conversion into the ER model, and implementing a function for inputting an arbitrary constraint when the structure of the information is defined.

13. A medium according to claim 11, recording a program for making the computer further implement a function as means for developing the ER model into hypertext.

14. A medium according to claim 13, recording a program for developing a hyperlink based on reference information of a data definition indicating a relationship between entities, and a hyperlink corresponding to a relationship in a direction opposite to said reference information.

* * * * *

UNITED STATES PATENT AND TRADEMARK OFFICE
CERTIFICATE OF CORRECTION

PATENT NO.      : 6,453,318 B1                                              Page 1 of 1
DATED           : September 17, 2002
INVENTOR(S)     : Yasuhiro Shiina et al.

It is certified that error appears in the above-identified patent and that said Letters Patent is hereby corrected as shown below:

<u>Title page,</u>
Item [54], Title, should read -- MANAGEMENT APPARATUS OF STRUCTURED INFORMATION AND METHOD OF MANAGING THE INFORMATION --

Signed and Sealed this

First Day of April, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,453,318 B1
DATED : September 17, 2002
INVENTOR(S) : Yasuhiro Shiina et al.

It is certified that error appears in the above-identified patent and that said Letters Patent is hereby corrected as shown below:

<u>Title page,</u>
Item [73], the Assignee name is incorrect, it should read
-- NS Solutions Coporation -- not "Nippon Steel Corporation".

Signed and Sealed this

Tenth Day of June, 2003

JAMES E. ROGAN
*Director of the United States Patent and Trademark Office*